United States Patent [19]

Richards

[11] Patent Number: 4,637,788
[45] Date of Patent: Jan. 20, 1987

[54] APPARATUS FOR MAKING A CONFECTION INCLUDING A DEPOSITING MEANS AND CONVEYOR CARRIED MOLDS

[75] Inventor: Brian T. Richards, Birmingham, England

[73] Assignee: Cadbury Limited, Bournville, England

[21] Appl. No.: 538,803

[22] Filed: Oct. 5, 1983

[30] Foreign Application Priority Data

Oct. 13, 1982 [GB] United Kingdom ............... 8229266
Oct. 29, 1982 [GB] United Kingdom ............... 8231008

[51] Int. Cl.⁴ .................... A23G 1/21; A23G 1/22; A23G 1/26
[52] U.S. Cl. .................... 425/4 R; 222/145; 251/122; 425/145; 425/166; 425/261; 425/449
[58] Field of Search .................... 425/4 R, 817 R, 447, 425/449, 256–259, 261, 377, 145, 166; 251/62, 63.5, 118, 120, 121; 239/583, 584; 222/145, 488, 486, 559, 563, 509

[56] References Cited

U.S. PATENT DOCUMENTS

| 1,891,374 | 12/1932 | Ehemann | 251/120 |
| 1,894,505 | 1/1933 | Westerman et al. | 251/120 |
| 2,202,917 | 6/1940 | Oswalt | 425/447 |
| 2,531,479 | 11/1950 | Southern et al. | 251/120 |
| 2,555,067 | 5/1951 | Tunley | 425/449 |
| 2,597,175 | 5/1952 | Perkins | 222/145 |
| 2,685,294 | 8/1954 | Gold et al. | 251/122 |
| 2,703,273 | 11/1972 | Illing | 251/122 |
| 2,736,480 | 2/1956 | Anderson | 222/478 |
| 2,774,989 | 12/1956 | Crammond et al. | 425/447 |
| 2,848,721 | 8/1958 | Fredrickson | 239/447 |
| 3,180,360 | 4/1965 | Pavlin | 251/118 |
| 3,201,937 | 8/1965 | McKee | 251/122 |
| 3,298,389 | 1/1967 | Freeman | 251/122 |
| 3,315,899 | 4/1967 | Quarve | 239/583 |
| 3,396,848 | 8/1968 | Kozel | 251/120 |
| 3,426,798 | 2/1969 | Chernak | 251/120 |
| 3,496,886 | 2/1970 | Fohr | 426/660 |
| 3,845,788 | 11/1974 | Laven | 251/122 |
| 4,015,631 | 4/1977 | Hayes | 251/122 |
| 4,100,304 | 7/1978 | Getman | 426/281 |
| 4,155,689 | 5/1979 | Getman | 425/114 |
| 4,272,558 | 6/1981 | Bouette | 426/474 |
| 4,413,646 | 11/1983 | Platt et al. | 251/122 |
| 4,418,083 | 11/1983 | Bouette | 426/316 |

FOREIGN PATENT DOCUMENTS

| 2248235 | 10/1972 | Fed. Rep. of Germany . | |
| 2328407 | 10/1976 | France . | |
| 2398597 | 7/1978 | France . | |
| 525873 | 2/1954 | Italy | 425/449 |
| 1450085 | 7/1973 | United Kingdom . | |
| 2081064 | 7/1980 | United Kingdom . | |
| 0034884 | 2/1981 | United Kingdom . | |

Primary Examiner—Willard E. Hoag
Attorney, Agent, or Firm—Holman & Stern

[57] ABSTRACT

In the manufacture of a foamed confection such as foamed chocolate, a confection in liquid form is mixed with carbon dioxide under pressure and passed still under pressure to a depositor. The mixture is discharged from the depositor through annular outlet orifices which are opened and closed in turn by associated valves so that at any one time some of the orifices are discharging the mixture, and the number of orifices which are closed does not vary. Each annular orifice has a length which is not greater than its diameter. Each valve has an annular valve seat and a valve member movable into and out of engagement with the valve seat.

9 Claims, 7 Drawing Figures

APPARATUS FOR MAKING A CONFECTION INCLUDING A DEPOSITING MEANS AND CONVEYOR CARRIED MOLDS

BACKGROUND OF THE INVENTION

1. Field of the Invention

This invention relates to an apparatus for manufacturing confectionery and is more particularly concerned with the manufacture of a confectionery wherein a confection, e.g. chocolate, in a liquid phase is thoroughly mixed with gas under pressure and is then passed through a depositor into a zone of lower pressure so that gas expansion occurs to produce an expanded product which requires further cooling for more rapid solidification. The invention also relates to a depositor for use in such manufacture.

2. Description of the Prior Art

We have found, in the manufacture of an expanded confection, that, for volume production, it is difficult to produce a product which is evenly expanded to the desired extent. We have also found that the manner in which the mixture of liquid confection and gas is discharged through the depositor has a substantial effect on the quality of the expanded product in so far as cell uniformity and size are concerned.

BRIEF SUMMARY OF THE INVENTION

An object of the present invention is to provide an apparatus whereby cell uniformity and size can be strictly controlled.

According to one aspect of the present invention, there is provided an apparatus for manufacturing a confection comprising means for mixing a confection in liquid phase form with gas under pressure, a depositor for receiving the mixture and for discharging said mixture to a lower pressure zone, and means for receiving said mixture from the depositor and allowing said mixture to cool to form an expanded confection, wherein the depositor includes at least one annular orifice through which said mixture is discharged, the annular orifice discharging into said region of lower pressure and having a length which is not greater than its diameter, and a valve associated with said at least one annular orifice, said valve including an annular valve seat surrounding said annular orifice and a valve member movable into and out of engagement with the valve seat.

Preferably, the inner peripheral wall of the annular orifice is defined by an extension of the valve member.

In one embodiment, the valve seat is defined by a frusto conical surface which merges with an upstream end of the outer peripheral wall of the annular orifice, and the movable valve member has a valve seat-engaging edge which is rounded.

In another embodiment, the valve seat is defined by a rounded surface which merges with an upstream end of the outer peripheral wall of the annular orifice, and the valve member has a frusto conical surface engageable with the valve seat.

Typically, in either embodiment, the rounding on the valve member or the valve seat, as the case may be, is of a radius of 0.5 to 2 mm, preferably 1 mm.

It is preferred for the diameter of the inner peripheral wall of the annular orifice to be ½ to ⅔ that of the annular contact line between the valve member and the valve seat.

In a highly preferred embodiment, a multiplicity of such annular orifices and associated valves are provided in the depositor, and the valves are so controlled that they are opened and closed in sequence so that at any one time during operation of the process, the same number of valves are open, the number being such as is required to give the period of switch off during the cycle to produce the desired length of deposit.

Preferably also, more than one depositor is fed with said mixture of liquid phase confection and gas.

With such a construction of annular outlet orifice, we have found that the shear which is imparted to the mixture as it is expanding during passage through the orifice is miniminized because of the short length of the passage through which the mixture is constrained to pass and, for a given throughput, produces less of a velocity profile across the passage than an outlet orifice of circular cross-section. Large velocity profiles across the outlet orifice have been found to give uneven expansion of the confection.

According to another aspect of the present invention, there is provided a depositor for use in manufacturing confectionery according to the present invention, said depositor comprising a body for receiving a mixture of a confection in liquid phase form and gas, said body having at least one outlet orifice through which said mixture is discharged, in use, the annular orifice having a length which is not greater than its diameter, and a depositor further including a valve having an annular valve seat surrounding said annular orifice and a valve member movable into and out of engagement with the valve seat.

Where a material is to be deposited into a multiplicity of molds from a series of orifices in one or more depositors, problems can arise in obtaining products of consistent quality with existing depositors if the material to be deposited is pressure sensitive. An example of such a material is a foamed confection such as foamed chocolate. Fluctuations in the pressure of the supply causes pressure variations in the material being molded and undesirable variations in the density and cell size of the foamed product as well as inconsistencies in the weight of material deposited in the molds.

It is a further object of the present invention to obviate or mitigate this disadvantage.

According to a further aspect of the present invention, there is provided apparatus for depositing a material from a multiplicity of outlets into respective rows of molds, said apparatus comprising at least one depositor containing a multiplicity of outlets and respective valves for controlling the flow of material through said outlets; a conveyor for conveying rows of molds past the depositor; means for supplying material under pressure to said at least one depositor; and control means for periodically opening and closing the valves in a sequence such that, in use, the number of valves which are open and the number of valves which are closed in said at least one depositor does not vary.

With such an arrangement, pressure fluctuations in the supplying means caused by more valves being open at some times than at other times in the operating cycle are obviated.

In a preferrred embodiment, the periodic valve opening and closing means is arranged so that, at any time only one valve in the, or each, depositor is closed whilst the remaining valves in the , or each, depositor are open.

Preferably, the conveyor is continuously movable, the molds associated with the, or each, depositor are arranged in rows which extend longitudinally of the direction of travel of the conveyor with the molds in the respective rows being aligned in a direction at right angles to said direction of travel; said at least one depositor is inclined at an acute angle to the direction of alignment of the rows; and said valve opening and closing means is controlled so as to cause material to be discharged from said depositor into a respective one of the sets of aligned molds during each cycle of operation.

Preferably, also a plurality of depositors is provided, and the valve opening and closing means is arranged to cause a respective one of the valves in every head to be periodically opened and closed simultaneously. With such an arrangement, it is convenient to provide a separate control valve for controlling operation of each set of valves in the heads which are to be opened and closed simultaneously. Preferably, each control valve is arranged to be operated by a respective cam, the cams being mounted on a common shaft driven from the conveyor and being equi-angularly staggered around the shaft.

BRIEF DESCRIPTION OF THE DRAWINGS

An embodiment of the present invention will now be described, by way of example, with reference to the accompanying drawing, wherein.

DETAILED DESCRIPTION

Figure 1:
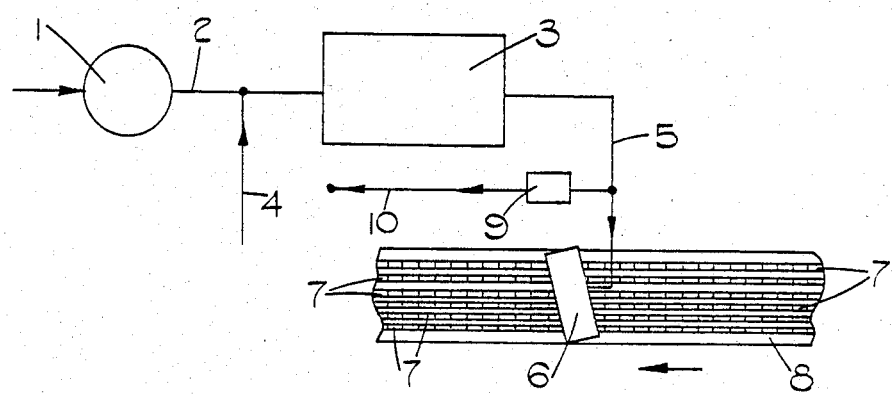
FIG. 1 is a schematic illustration of apparatus for manufacturing aerated chocolate according to the present invention to illustrate the principles of the present invention.

Referring now to FIG. 1, the apparatus comprises a pump 1 which feeds tempered chocolate along line 2 to a mixer 3 of a per se known type (for example a mixer sold under the code E or G by MONDOMIX). Carbon dioxide under pressure is fed via a line 4 into the line 2 and is intimately mixed with the tempered chocolate in the mixer 3. It will be appreciated that the tempered chocolate is maintained at an elevated temperature such that it is in a liquid state. The mixture of liquid chocolate and dissolved carbon dioxide is discharged from the mixer and is passed via line 5 to a depositor 6 from which it is discharged into molds 7 which are arranged in six parallel rows extending longitudinally of a conveyor 8 which moves the molds 7 under the depositor 6. The depositor 6 has six outlets which discharge into the respective rows of molds 7. Discharge is arranged to occur such that, at any one time, five of the outlets are open whilst the other is closed, the outlets being closed in turn, as will be described hereinafter. In order to maintain the required pressure conditions within the system, a pressure relief valve 9 controls flow of the mixture through a return bypass 10. In this way, the amount of deposit is controlled. In the arrangement according to FIG. 1, only one depositor 6 has been shown. In practice, four such depositors will be provided, each discharging into an arrangement of six rows of molds on a respective conveyor, as will be apparent later.

In accordance with usual practice, the lines through which the liquid chocolate is passed and the depositor itself are jacketed and supplied with warm water to maintain the chocolate in a liquid phase up to the depositor 6.

Figure 2:
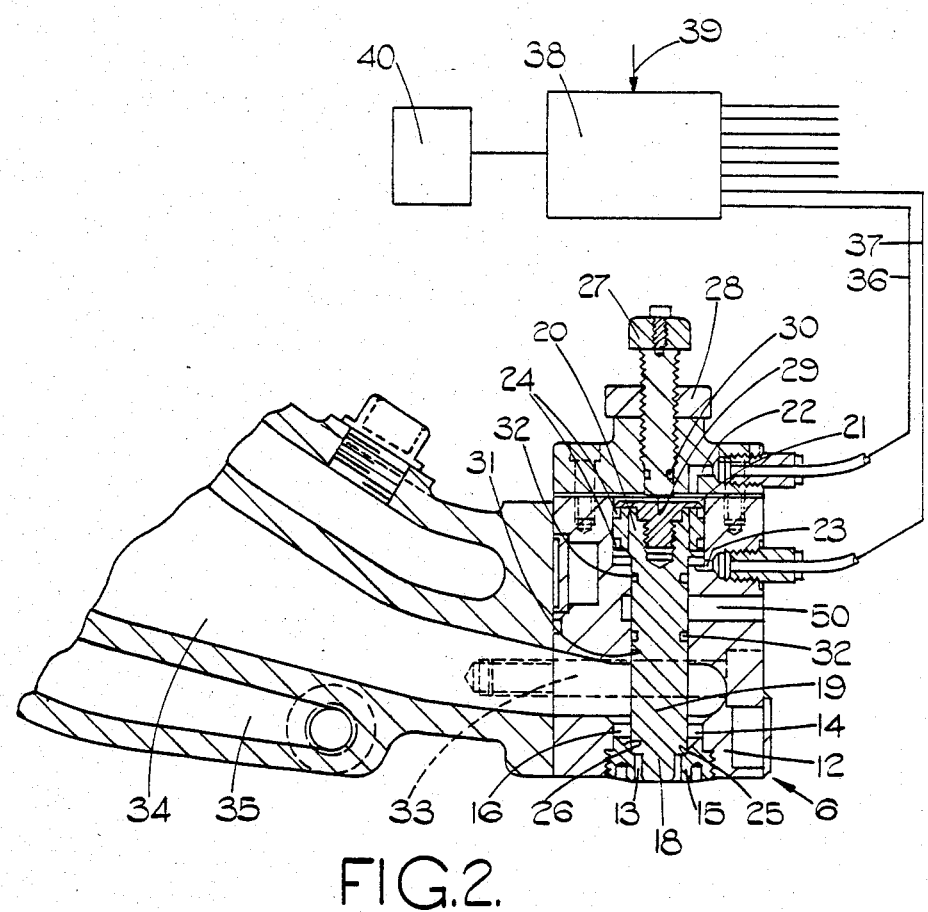
FIG. 2 is a cross-sectional view through a depositor used in the apparatus of FIG. 1, and showing schematically a control for such depositor.
Figure 7:
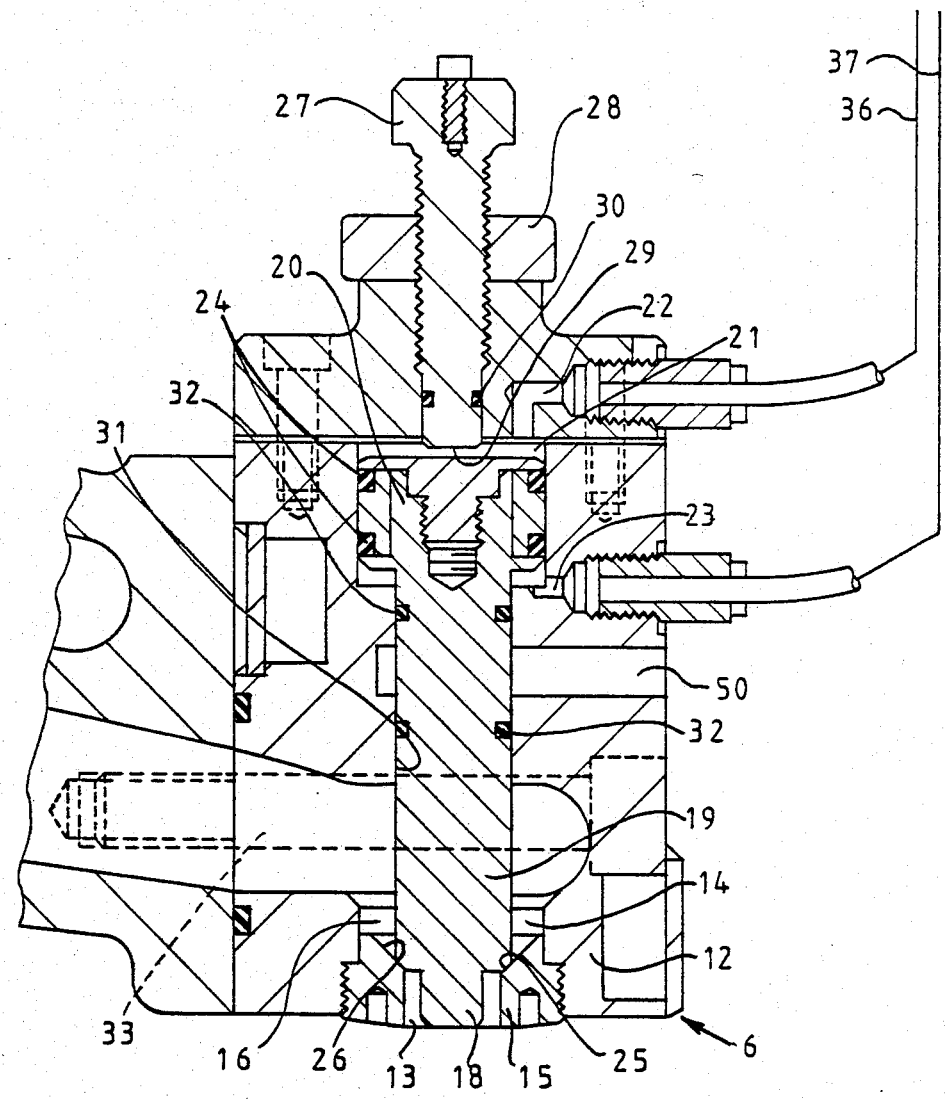
FIG. 7 is an enlarged view of part of FIG. 2.

Referring now to FIGS. 2 and 7, the depositor 6 includes a body 12 in which six outlet passages or orifices 13 and associated valves 14 are provided. The outlet orifices 13 and associated valves 14 are identical and, for the sake of convenience, only one such outlet orifice 13 and associated valve will be described. The outlet orifice 13 is of annular shape, the outer peripheral wall of the orifice 13 being defined by a hardened insert 15 which is disposed with its upper end in a circular recess 16 in the body 12 and with its lower end screw fitted into the body 12. The inner peripheral wall of the annular orifice 13 is defined by a cylindrical projection 18 of circular cross-section which extends from the lower end of a valve member 19 which is vertically slidable in the body 12. The upper end of the valve member 19 is comprised of a multi-part piston 20 which is slidable in an upper recess 21 in the body 12. The upper recess 21 defines a cylinder which is arranged to be supplied with air for piston controlling purposes via one or other of ports 22, 23 disposed on opposite sides of the piston 20, and is further arranged for pressure relief by means of a relief-mechanism and bypass pneumatic line 21a whose function is homologous to elements 9 and 10 in FIG. 1. In this embodiment, the recess 21 has a smooth bore and the piston 20 is fitted with annular sliding seals 24. At its lower end, in the region of the projection 18, the valve member 19 has an annular shoulder which is rounded to 1.0 mm radius. This shoulder 25 is engageable with a frusto-conical valve seat 26. The valve seat 26 is downwardly tapering and is provided in the insert 15 so that its lower, smaller diameter end merges with the upper end of that portion of the insert 15 defining the outer peripheral wall of the annular orifice 13. A manually adjustable screw 27 and associated locking nut 28 are provided at the upper end of the body 12, the screw 27 extending into the upper recess 21 so as to define an abutment 29 for limiting upward movement of the valve member 19 away from the valve seat 26. A sealing ring 30 surrounds the screw 27 to prevent unwanted escape of air from the upper recess 21. The intermediate portion of the valve member 19 is machined so as to be a sliding fit in a bore 31 extending between the recess 16 and the upper recess 21. Sealing rings 32 are provided in the bore 31 to prevent escape of air downwardly and escape of material being deposited upwardly and into the recess 21. The body 12 is slotted at 50 so that the region of the bore 31 between the sealing rings 32 is exposed to atmosphere. This allows material being deposited to leak to atmosphere rather than to leak into the recess 21 in the event of failure of the lower sealing ring 32.

The body 12 is provided with an inlet passage 33 leading to each recess 16, each inlet passage 33 being connected with a common manifold 34 fitted with a water jacket 35 for maintaining material being passed to the depositor 6 at the required temperature. The manifold 34 is connected with the line 5.

Each of the ports 22, 23 is connected via a respective air line 36, 37 and all of the air lines 36, 37 lead to a multiway distributor and sequencing valve assembly 38 connected with an air supply via line 39. The valve assembly 38 is controlled by an electrical or pneumatic control unit 40 to perform the aforesaid sequencing of the valves 14 in each depositor 6 so that, at any one time, one of the valves 14 in each depositor 6 is closed whilst the others remain open. In the condition shown in FIG. 2, the valve 14 is shown closed. When it is the turn of the illustrated valve to be opened, a signal is passed from the control unit 40 to the valve assembly 38 which causes line 39 to be connected with line 37 and line 36 to be exhausted to atmosphere. This causes the piston 20 and thereby the valve member 19 to be lifted until the upper end of the valve member 19 engages against the abutment 29. Liquid chocolate and dissolved carbon dioxide which has been fed to the manifold 34 by the line 5 and which fills the inlet passage 33 and the recess 16 is then permitted to flow through the outlet orifice 13 to be discharged into a mold 7 which is passing thereunder. Because of the relatively limited axial extent of the outlet orifice 13 relative to its diameter (not greater than 100% of the outer diameter of the orifice 13), the material being deposited is subjected to a relatively even shear across the cross-section of the orifice 13. As it passes through the orifice 13 and discharges externally of the depositor 6, the material is exposed to atmospheric pressure and so experiences a pressure release which causes carbon dioxide dissolved in the chocolate to come out of solution and thereby expand the material as it is being deposited in the mold 7. Even expansion of the material occurs in view of the relatively limited axial extent of the orifice 13. In the embodiment illustrated, the axial extent of the orifice 13 is only 50% of its outer diameter so that substantially parallel flow of the material through the orifice 13 is only just established. It will be appreciated that the material passing into the outlet orifice 13 via the valve seat 26 will have a radially inward component of movement as a result of passage from the larger diameter recess 13. This radially inward component of movement of the material stops upon flowing through the orifice 13. The annular nature of the orifice 13 allows relatively high flow rates to be obtained without incurring an undue difference in velocity profile across the cross-section of the orifice 13. High velocity profiles are to be avoided because the Applicants have found that this leads to uneven expansion of the material.

The material issues from the orifice 13 into chocolate shells in the molds 7 and subsequent cooling of the material until it solidifies is effected in the molds 7 which are vibrated in a manner known per se to ensure filling of the molds. After solidifying, the resultant expanded chocolate confection can then be demolded and subsequently packed.

In the above described embodiment, the pressure within the mixer 3 and line 5 is maintained at a fixed pressure between one and a half and two atmospheres (152-203 kPa). The exact pressure will depend on the type of expansion that is required. The lift on each valve member 19 is controlled by the screw 27 so that up to about 8 kg per minute of material pass through each orifice 13, the amounts passing through each orifice 13 being controlled so as to be the same by appropriate adjustment of the lift of each valve member 19 using manually adjustable screw 27. Typically, the lift on each valve member is about 1.1 mm. In this embodiment, the length of each orifice 13 is 10 mm, the outer diameter thereof is 16 mm, the inner diameter of each outlet orifice 13 (ie the diameter of the projection 18) is 10 mm and the diameter of the annular contact line between the shoulder 25 and the frusto conical valve seat 26 is 19 mm. We have found that by using the aforesaid sequencing of the valves 14, it is relatively simple to keep the system pressure constant at one and a half atmospheres (152 kPa) or at any other desired pressure up to 2 atmospheres (203 kPa) and this also assists in obtaining even expansion of the material.

Figure 3:
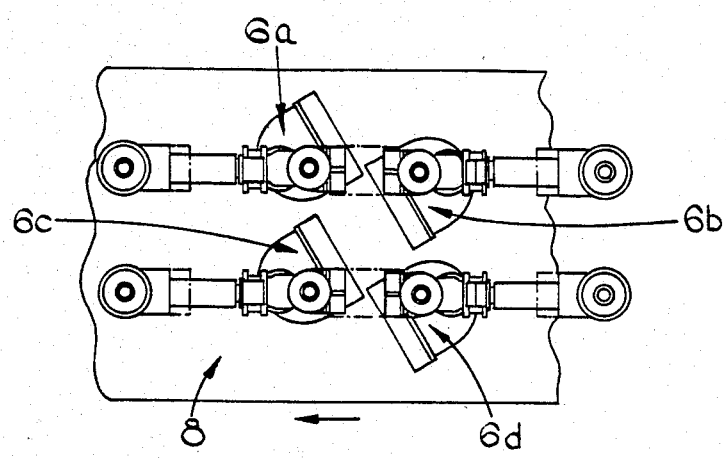
FIG. 3 is a schematic top plan view of four depositors forming part of a practical embodiment of apparatus for manufacturing aerated chocolate according to the present invention.

Referring now to FIG. 3, there is shown a four depositor head arrangement in which each depositor 6a, 6b, 6c and 6d is of the type described with reference to FIG. 2. Each depositor 6a to 6d is arranged to fill a respective set of 6 rows of molds (not shown in FIG. 3) or conveyor 8. All the rows of molds extend parallel to the direction of movement of the conveyor 8 and the molds in each set are aligned in a direction perpendicular to the direction of extent of the rows (see FIG. 1). In the embodiment of FIG. 3, the depositors 6a to 6b are inclined at an acute angle of about 30° relative to the aforesaid perpendicular direction so that, having regard to the speed of travel of the molds and the sequencing of operation of the valves in each depositor, one set of aligned molds is filled during each cycle of operation of each depositor and, at any instant, four molds (one by each depositor) are being filled.

Figure 4:
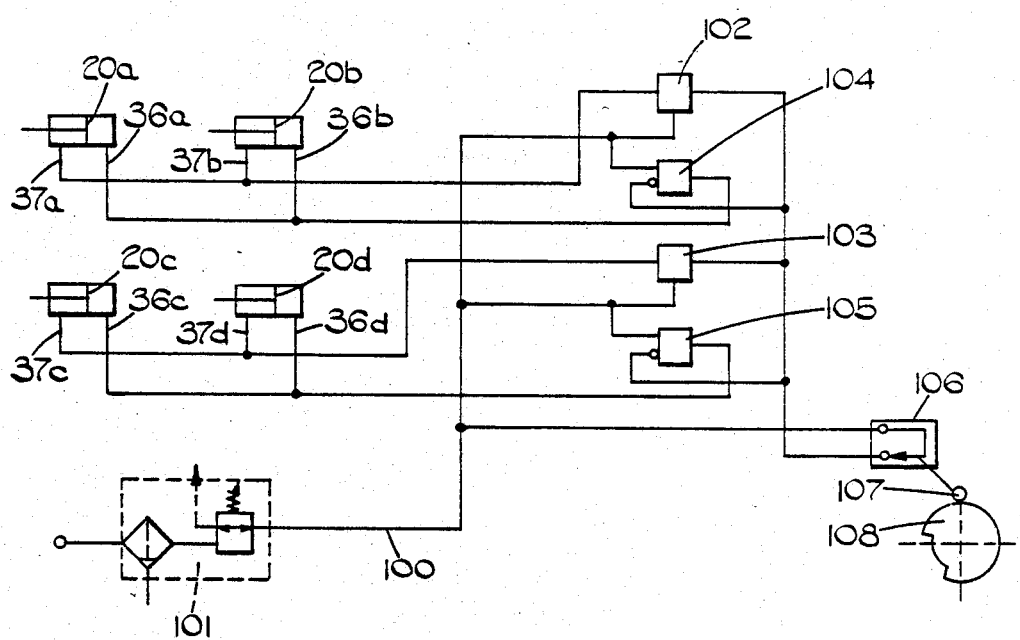
FIG. 4 is a schematic circuit diagram showing a typical pneumatic control circuit, for a respective pneumatically operated valve in each of the four depositors of FIG. 3.

The control circuit for simultaneous opening and closing of respective valves in the four depositiors 6a to 6d is illustrated in FIG. 4, it being understood that five other identical control circuits are provided, one for each of the remaining valves in the respective depositiors 6a to 6d. The pneumatic circuit includes a pneumatic pressure supply line 100 from a pressure source 101 common to all the six control circuits. The line 100 is connected to two pneumatic YES gates 102 and 103 and two pneumatic NOT gates 104 and 105. The line 100 is also connected to an pneumatic valve 106 which is normally closed ie biassed to a position in which pressure is not transmitted. The valve 106 is provided with an operating arm terminating in a roller-type cam follower 107 which engages a respective rotary cam 108. The valve 106 is connected with each of the gates 102 to 105 so as to transmit pressure thereto when the cam 108 is in a position in which it biasses the operating arm 107 to a position in which the valve 106 is open. The form of the cam 108 is such that the valve 106 is open for 300° of the rotary movement of the cam 108 but closed for the remaining 60° of rotary movement of the latter.

However, provision is made for adjustment of this angle. Cam 108 is driven from the conveyor 8 in a manner to be described.

When the valve 106 is opened (as shown in FIG. 4), pressure is transmitted to the gates 102 to 105. Under these conditions, the YES gates 102 and 103 permit flow of air through lines 37a to 37d to lift the four pistons 20a to 20d in the four depositiors 6a to 6d simultaneously. This opens the valves of the associated nozzles. It will be appreciated that flow of air to the pistons 20 through lines 36 will not be permitted via the NOT gates 104 and 105 under these circumstances. When the cam 108 has rotated to a position to release the cam follower 107, the pneumatic valve 106 is allowed to close. Under these conditions, the NOT gates 104 and 105 permit flow of air to the pistons 20a to 20d whilst the YES gates 102 and 103 no longer permit flow of air to the pistons 20a to 20d through the lines 37a to 37d. The result of this is that the pistons 20a to 20d are lowered to close the valves of the associated nozzles so that mould filling through such nozzles is terminated.

Figure 5:
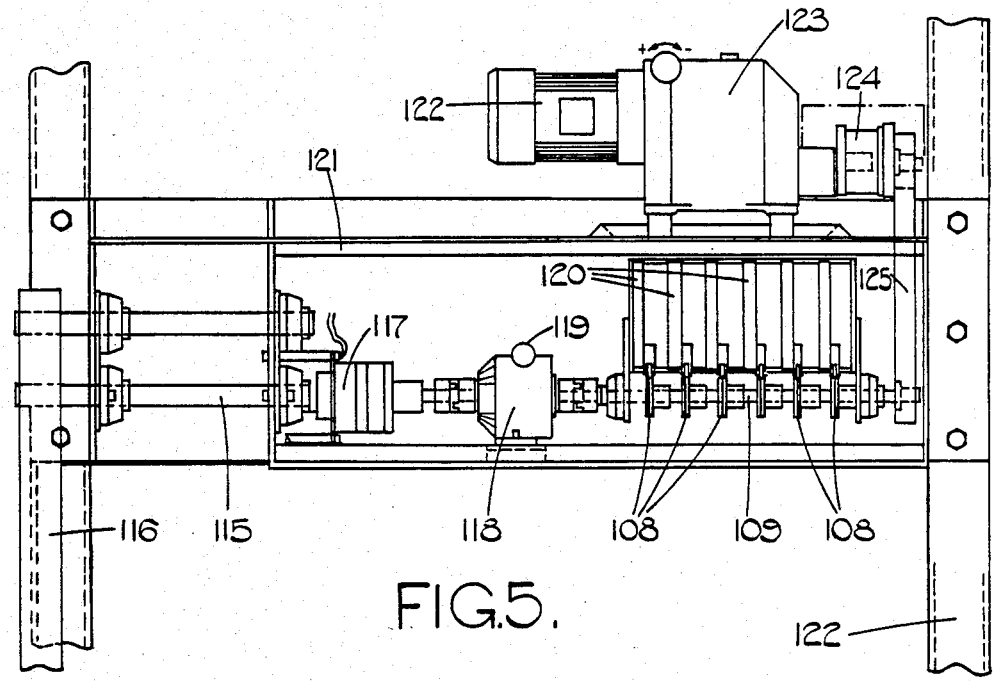
FIG. 5 is a front elevational view of a mechanism for operating control valves in six pneumatic circuits of the type illustrated in FIG. 4.
Figure 6:
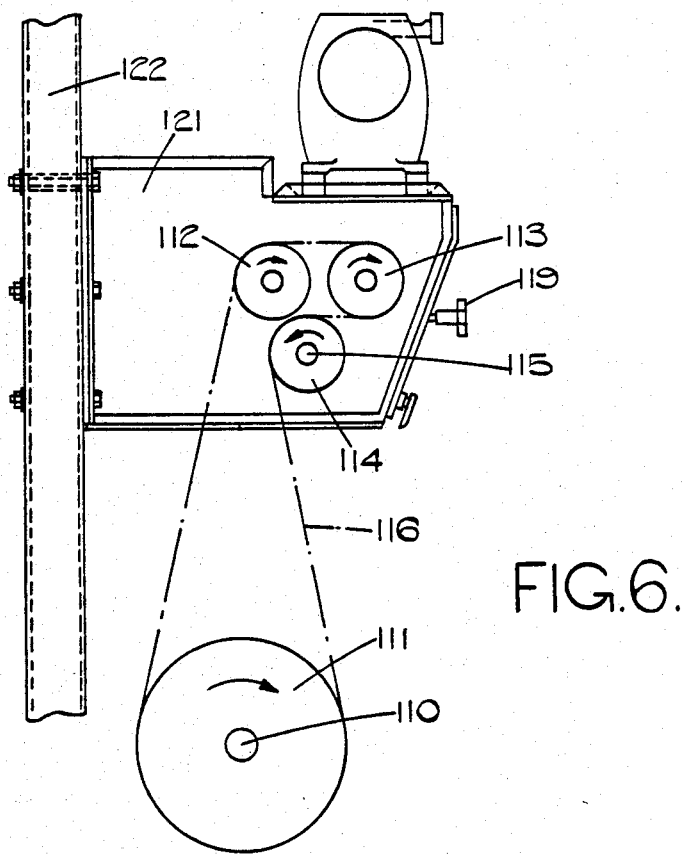
FIG. 6 is a left end view of the mechanism of FIG. 5.

Referring now to FIGS. 5 and 6, the six cams 108 respectively associated with the six pneumatic control circuits are mounted on a common rotary shaft 109 in equi-angularly staggered relationship. It will thus be appreciated that for each 60° angle of rotary movement of the shaft 109, a respective one of the pistons 20 in each of the four depositors will be in a lowered position whilst the remaining ones will be in a lifted position. The four pistons 20a to 20d which are operated simultaneously are those which are provided at corresponding locations in the four depositors and the arrangement is such that during rotation of the shaft 109 the valves in each depositor are opened sequentially starting from the most upstream valves and ending at the most downstream valve before repeating the cycle.

In order to ensure synchronization of the depositors 6 with the movement of the molds 7 on the conveyor 8 the shaft 109 is driven from a lay shaft 119 of the conveyor, toothed pulleys 111 to 114 of which pulley 111 is mounted on layshaft 110 and pulley 114 is mounted a shaft 115, and a belt 116 passing around pulleys 111 to 114. The shaft 115 is operably connected to the shaft 109 via a single angularly engagement position electromagnetic clutch 117 (manufactured by Monning Hoff, of Germany) and a phase variator 118 in the form of a differential gearbox fitted with a rotary control knob 119 for advancing or retarding the deposits relative to the molds in use. This knob 119 alters the angular position of the shaft 109 relative to the shaft 115.

The clutch 117, variator 118, shaft 109, cams 108 and six plates 120 carrying the gates 102 to 105 and the valve 106 of the respective pneumatic circuits are all mounted in a housing 121 mounted on a support frame 122 above the conveyor 8 (not shown) in FIGS. 5 and 6). Mounted on top of the housing 121 is an electric motor 122 which also drives the shaft 109 via a variable speed drive 123, a sprag clutch 124 and a belt 125. The motor 122 is not used during normal operation of the apparatus and the sprag clutch 124 free which when the shaft 109 is driven by the shaft 115 to prevent power being transmitted to the drive 123. The motor 122 is, however, used for testing and setting up purposes when it is not desired to have the conveyor 8 running.

I claim:

1. Apparatus for manufacturing a confection comprising: means for introducing gas under pressure into a confection in liquid phase form; mixing means for mixing said confection in liquid phase form with said gas under pressure; a depositor for receiving and discharging said mixture; means for feeding said mixture from said mixing means to said depositor; and at least one outlet valve means for said mixture in said depositor comprising an annular seat, a movable valve member positioned for co-operation with said annular seat to control the flow of said mixture through said outlet valve means, a portion of said valve member downstream of said valve seat defining with surrounding means an annular orifice means having a length which is not greater than its diameter, said annular orifice means being a final outlet orifice means from said depositor.

2. Apparatus as claimed in claim 1 wherein an inner peripheral wall of the annular orifice means is defined by an extension of said valve member and further comprising means to operate said valve member.

3. Apparatus as claimed in claim 1, wherein said valve seat is defined by a frusto conical surface which merges with an upstream end of the outer peripheral wall of the annular orifice means, and the movable valve member has a valve seat-engaging edge which is rounded.

4. Apparatus as claimed in claim 1, wherein said valve seat is defined by a rounded surface which merges with an upstream end of said outer peripheral wall of said annular orifice means, and said valve member has a frusto conical surface engageable with the valve seat.

5. Apparatus as claimed in claim 3, wherein said rounded edge has a radius of 0.5 to 2 mm.

6. Apparatus as claimed in claim 5, wherein said rounded edge has a radius of 1 mm.

7. Apparatus as claimed in claim 1, wherein the diameter of an inner peripheral wall of the annular orifice means is $\frac{1}{2}$ to $\frac{2}{3}$ that of an annular contact line between the valve member and the valve seat.

8. Apparatus as claimed in claim 1, wherein said depositor comprises: a plurality of said annular orifice means and associated valves; and means for controlling said valves to open and close said valves in sequence so that at any one time during operation of the apparatus the same number of valves are open, the number being such as is required to give the period of switch off during the cycle to produce the desired length of deposit.

9. Apparatus as claimed in claim 1, and further comprising: a plurality of depositors arranged to be fed with said mixture of liquid phase confection and gas.

* * * * *